(12) United States Patent
Scott et al.

(10) Patent No.: US 7,592,736 B2
(45) Date of Patent: Sep. 22, 2009

(54) PERMANENT MAGNET ELECTRIC GENERATOR WITH ROTOR CIRCUMFERENTIALLY ENCIRCLING STATOR

(76) Inventors: Terry Scott, Rt. 8, Box 758, Tulsa, OK (US) 74126; Johnny Scott, Rt. 8, Box 761, Tulsa, OK (US) 74126; Larry Hash, 505 W. 33$^{rd}$ St., Sand Springs, OK (US) 74063

( * ) Notice: Subject to any disclaimer, the term of this patent is extended or adjusted under 35 U.S.C. 154(b) by 360 days.

(21) Appl. No.: 11/619,485

(22) Filed: Jan. 3, 2007

(65) Prior Publication Data
US 2008/0157613 A1 Jul. 3, 2008

(51) Int. Cl.
*H02K 1/22* (2006.01)
(52) U.S. Cl. .............. 310/266; 310/156.26; 310/114
(58) Field of Classification Search ............ 310/156.26, 310/156.28, 67 R, 261, 62, 63, 58, 266, 112, 310/114, 216, 268
See application file for complete search history.

(56) References Cited

U.S. PATENT DOCUMENTS

| | | | | | |
|---|---|---|---|---|---|
| 4,900,965 | A | * | 2/1990 | Fisher | 310/216.006 |
| 5,311,092 | A | * | 5/1994 | Fisher | 310/266 |
| 6,727,632 | B2 | * | 4/2004 | Kusase | 310/266 |
| 7,250,702 | B2 | * | 7/2007 | Abou Akar et al. | 310/114 |
| 2007/0236099 | A1 | * | 10/2007 | Kim et al. | 310/266 |

* cited by examiner

*Primary Examiner*—Michael C Zarroli
(74) *Attorney, Agent, or Firm*—Michael A. Rahman

(57) ABSTRACT

A permanent magnet electric generator includes a housing, and a stator and a rotor assembly disposed inside the housing. The rotor assembly has annular inner and outer rings concentric with the axis of rotation. A plurality of permanent magnets is distributed on the inner surface of the outer ring. The stator assembly includes a plurality of stator blocks configured to form an annular ring-shaped stator member. The stator member is concentric with the axis of rotation and is interposed between the inner and outer rings such that the outer ring circumferentially encircles the stator member. The stator member is wound with a three-phase winding for a three-phase voltage output.

17 Claims, 12 Drawing Sheets

… …

PERMANENT MAGNET ELECTRIC GENERATOR WITH ROTOR CIRCUMFERENTIALLY ENCIRCLING STATOR

FIELD OF THE INVENTION

The present invention relates to electric generators. More specifically, the present invention relates to a permanent magnet electric generator in which a rotor circumferentially encircles a stator.

BACKGROUND OF THE INVENTION

In a conventional electric generator, a stator is wound with a three-phase winding forming a ring of wound wires. A rotor is disposed within the stator and in close proximity to the stator. The rotor includes permanent magnets concentrically arranged at intervals in the circumferential direction. The stator is a stationary member while the rotor is a rotational member having an axis of rotation. The stator and the rotor are concentric with the axis of rotation, the stator surrounding the rotor.

The stator is generally built with magnetically permeable material. The rotor is coupled to a source of rotational energy. As the rotor is rotated, due to the rotation of the permanent magnets in the rotor, a three-phase AC voltage is induced in the winding of the stator. The three-phase AC may be converted into a DC voltage, if desired, by a three-phase rectifier.

The general construction of the electric generator has not changed over the years. Improvements in construction of the generator is desired for increased efficiency and reliability.

BRIEF SUMMARY OF THE INVENTION

The present invention is a permanent magnet electric generator. The electric generator includes a housing. A rotor assembly is disposed inside the housing. The rotor assembly is concentric with an axis of rotation. The rotor assembly has annular inner and outer rings concentric with the axis of rotation. The rotor assembly is adapted to be rotationally coupled to a shaft. The shaft is rotationally coupled to a source of rotational energy for rotating the rotor assembly.

A plurality of permanent magnets are distributed on the inner surface of the outer ring. Each magnet has a north pole and a south pole aligned to the axis of rotation such that adjacent magnets have poles of alternating polarity. The permanent magnets are distributed circumferentially on the inner surface of the outer ring and in close proximity to the stator blocks.

The electric generator includes a stator assembly secured inside the housing. The stator assembly is at a static location with respect to and in close proximity to the rotor assembly. The stator assembly includes a plurality of stator blocks configured to form an annular ring-shaped stator member. The stator member is retained by a support structure. The stator member is concentric with the axis of rotation and is interposed between the inner and outer rings such that the outer ring circumferentially encircles the stator member. The stator member is wound with a three phase winding for a three-phase voltage output. When the rotor assembly is rotated in relation to the stator assembly, electricity is generated in the three-phase winding.

The stator blocks are formed by a plurality of strips of magnetically permeable material. The outer ring is made from a magnetically permeable material. The inner ring is made from a plurality of thin, ring-shaped magnetically permeable material. The stator member is epoxy potted and is securely attached to the support structure. A heat sink is attached to the support structure to dissipate heat generated during operation of the generator.

The rotor assembly includes a cylindrical hub configured to be coupled to a shaft to turn the rotor assembly. A rotor fan is mounted on the cylindrical hub. The rotor fan has a plurality of blades attached to the inner ring. The rotor fan is made from an insulating material. The rotor assembly includes a circular rear frame with an opening about the center. The circular rear frame is configured to retain the inner and outer rings in place. The circular rear frame is made from an insulating material.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

The present invention is a permanent magnet electric generator. The electric generator generally comprises a stator assembly, a rotor assembly and a housing. The stator assembly is a stationary member and the rotor assembly is a rotating member.

Figure 1A:
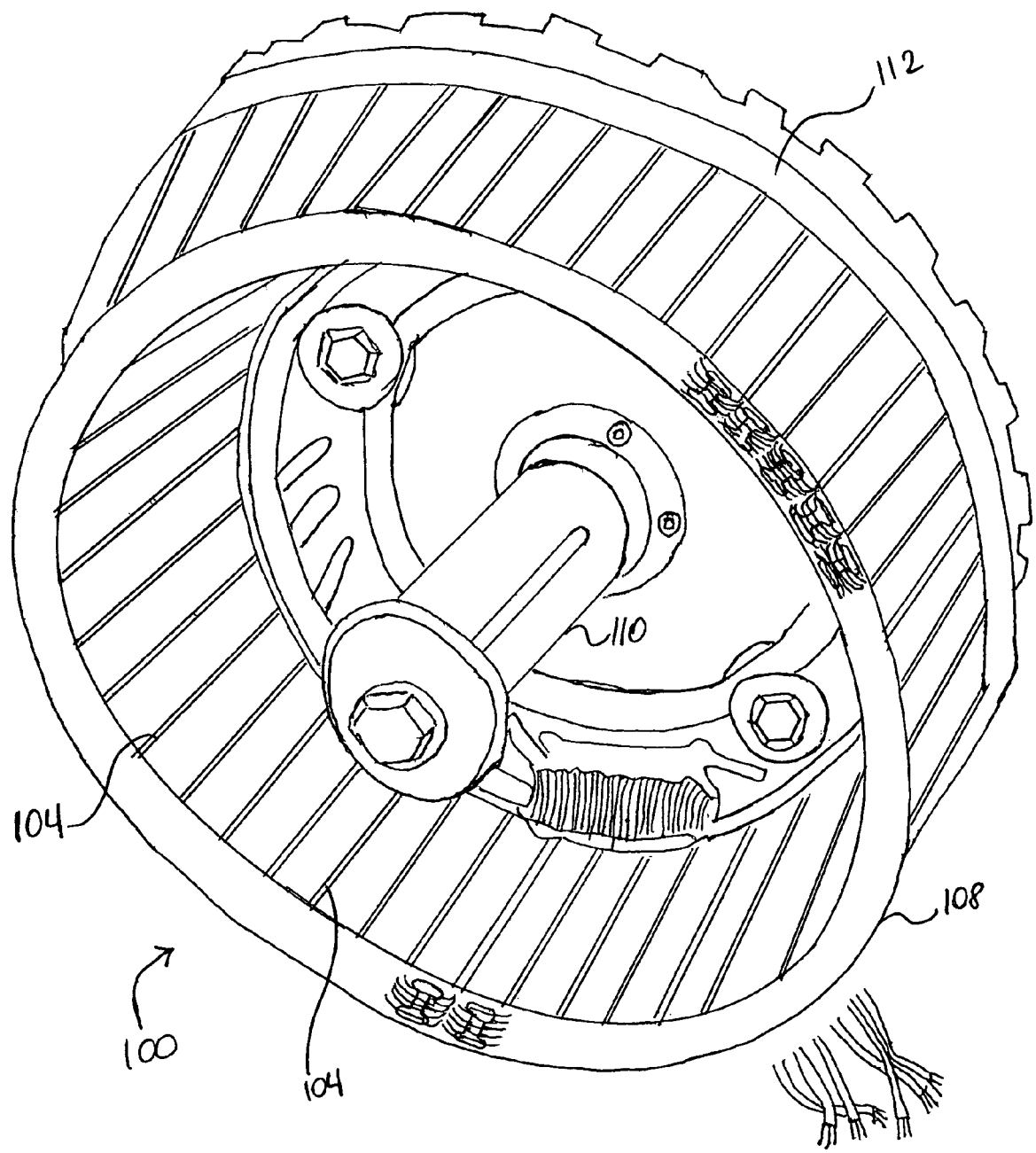
FIG. 1A is a perspective view of a stator assembly.

FIG. 1A is a perspective view of a stator assembly 100. The stator assembly 100 is secured inside a housing (not shown in FIG. 1A). The stator assembly 100 includes a plurality of stator blocks 104, which are arranged to form an annular ring-shaped stator member 108. The stator member 108 is wound with a three-phase winding (not shown in FIG. 1A), thus forming a ring of wound wires. The precise number of the stator blocks 104 in the stator member 108 can be varied to influence the output characteristics of the generator.

Figure 1B:
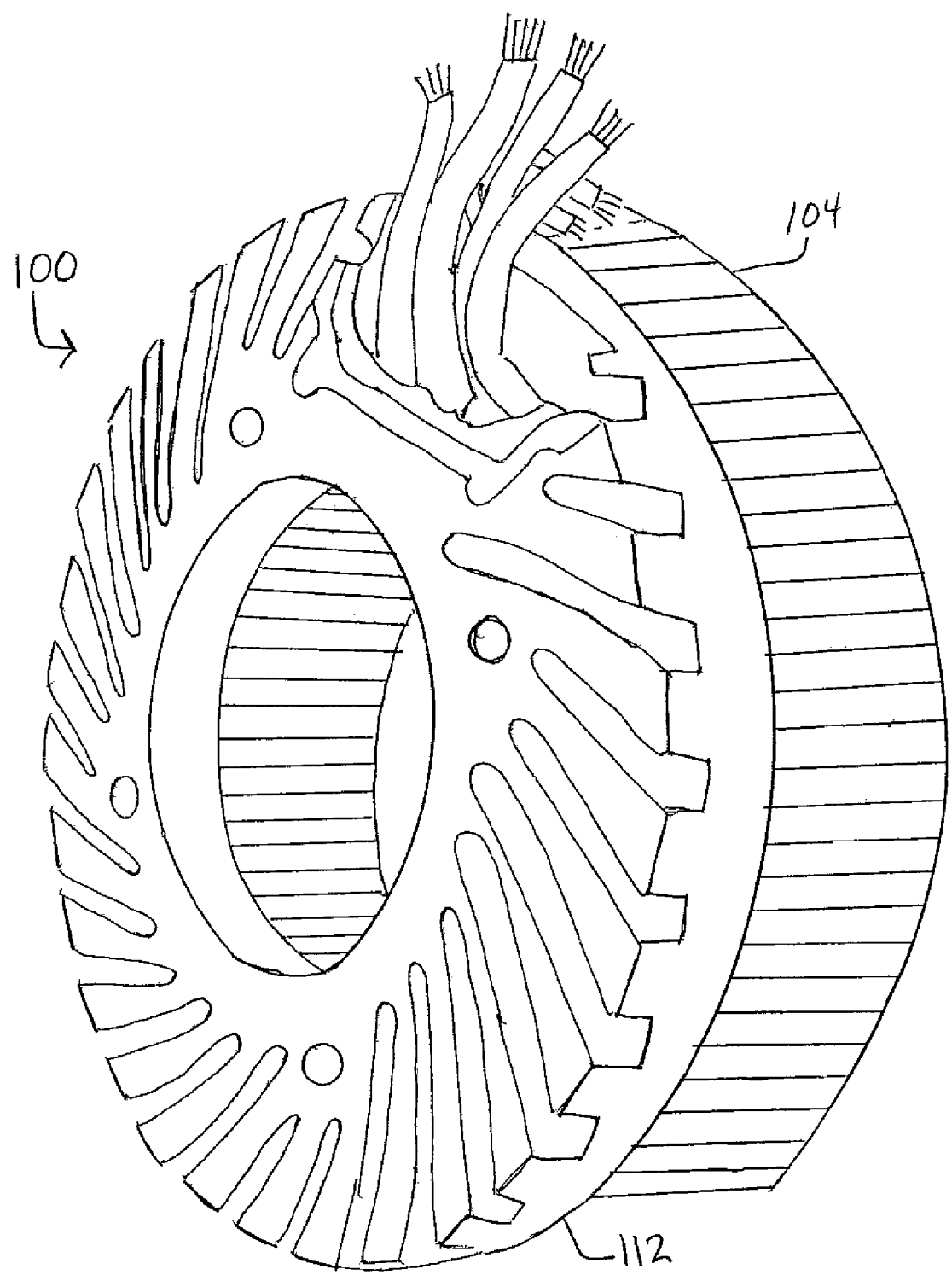
FIG. 1B is a perspective view of the rear side of the stator assembly.

The stator member 108 is firmly mounted on a ring-shaped support member 112 by suitable means, which holds the stator blocks 104 in alignment. FIG. 1B is a perspective view of the rear side of the stator assembly 100. The ring-shaped support member 112 may include a heat sink sized to be attached to the support member 112. The heat sink dissipates the heat generated in the stator assembly during operation.

A central shaft 110 shown in FIG. 1A is encircled by the stator assembly 104. The central shaft 110 is rotationally coupled to a source of rotational energy to turn a rotor assembly (not shown in FIGS. 1A and 1B).

Figure 2:
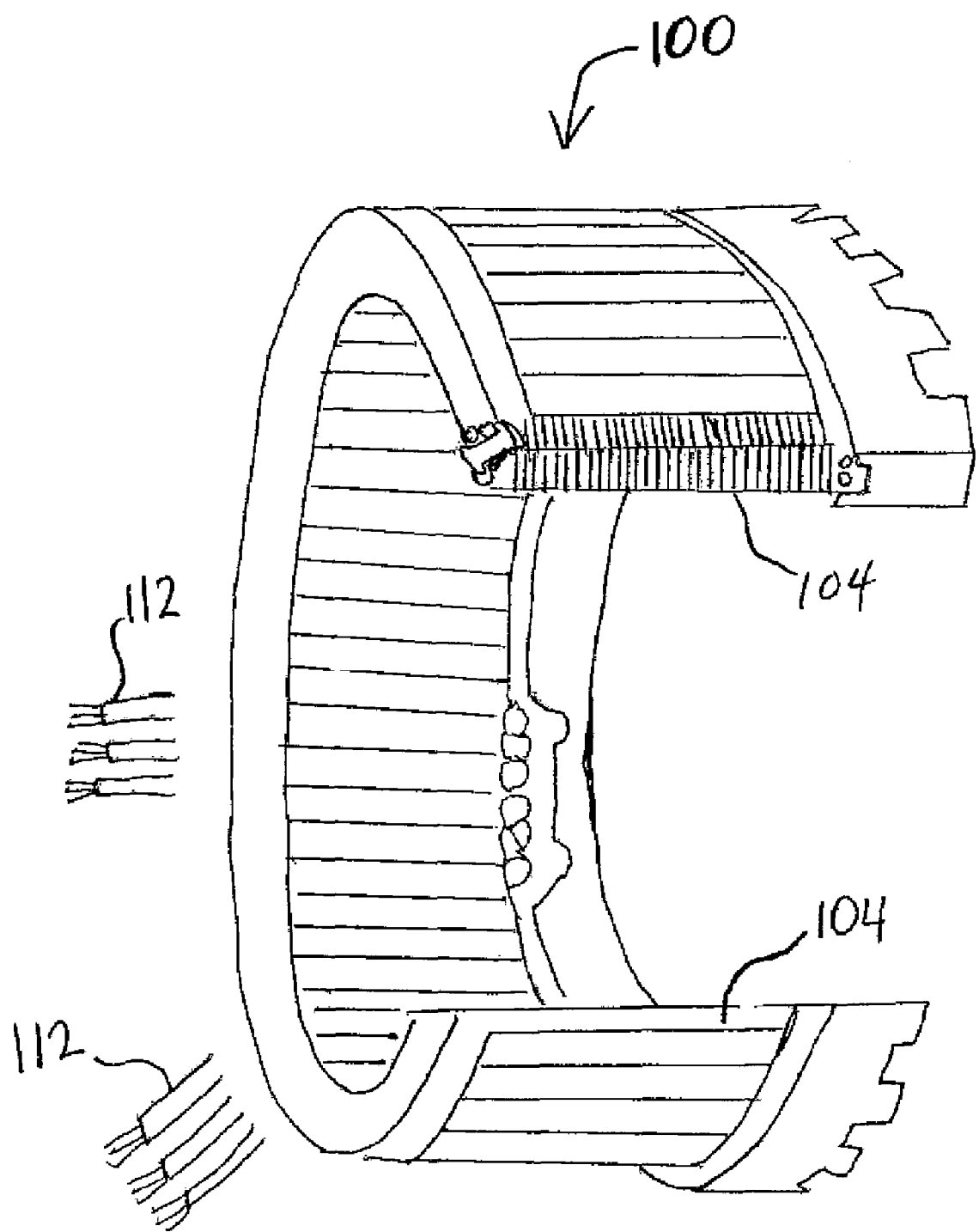
FIG. 2 is a perspective view of an embodiment of the stator assembly with a section removed.

FIG. 2 is a perspective view of an embodiment of the stator assembly 100 with a section removed to illustrate its construction. The stator assembly 100 includes a plurality of stator blocks 104 that are wound with a three phase winding 112 for a three-phase voltage output. In one embodiment, the stator blocks 104 are wound in a manner so that three phase winding 112 passes through the gap between adjacent stator blocks 104.

As will be appreciated, when the stator blocks 104 are wound up as shown in FIG. 2, the three phase windings will terminate into three pairs of externally accessible terminals or lead for a three phase voltage output.

Figure 3:
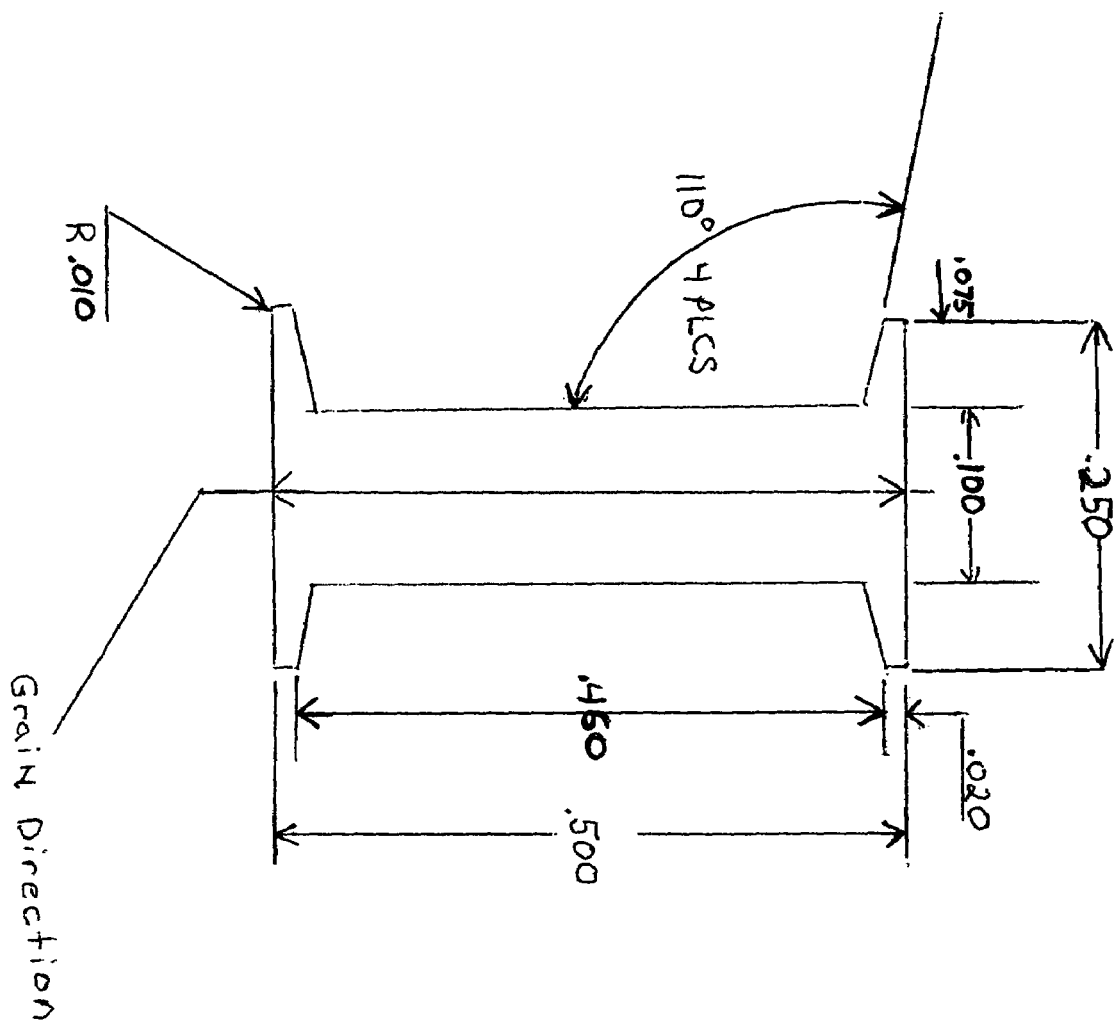
FIG. 3 shows a strip of an I-shaped material used to form a stator block.
Figure 4A:
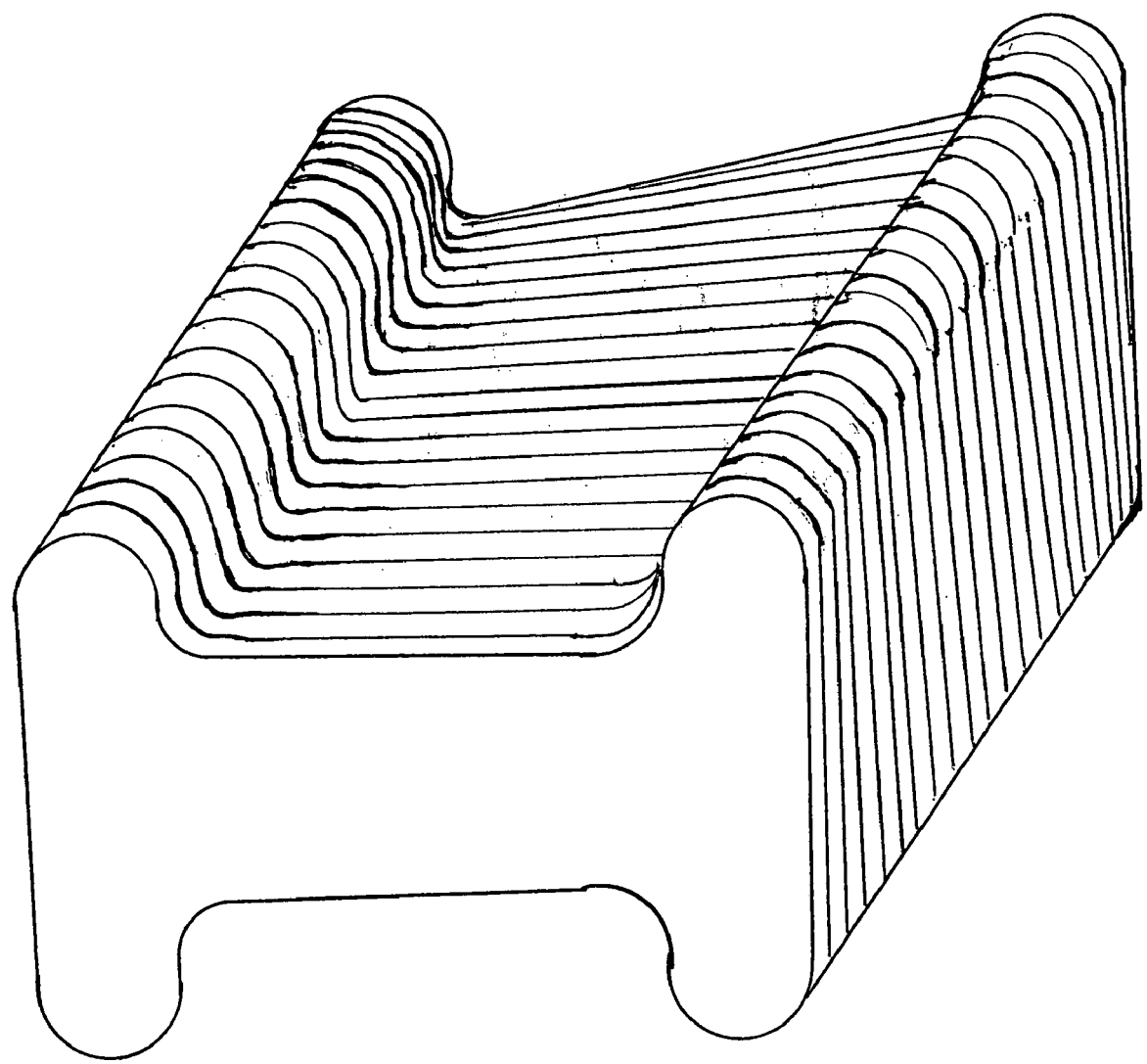
FIG. 4A shows a stator block formed by a stack of the I-shaped strips.
Figure 4B:
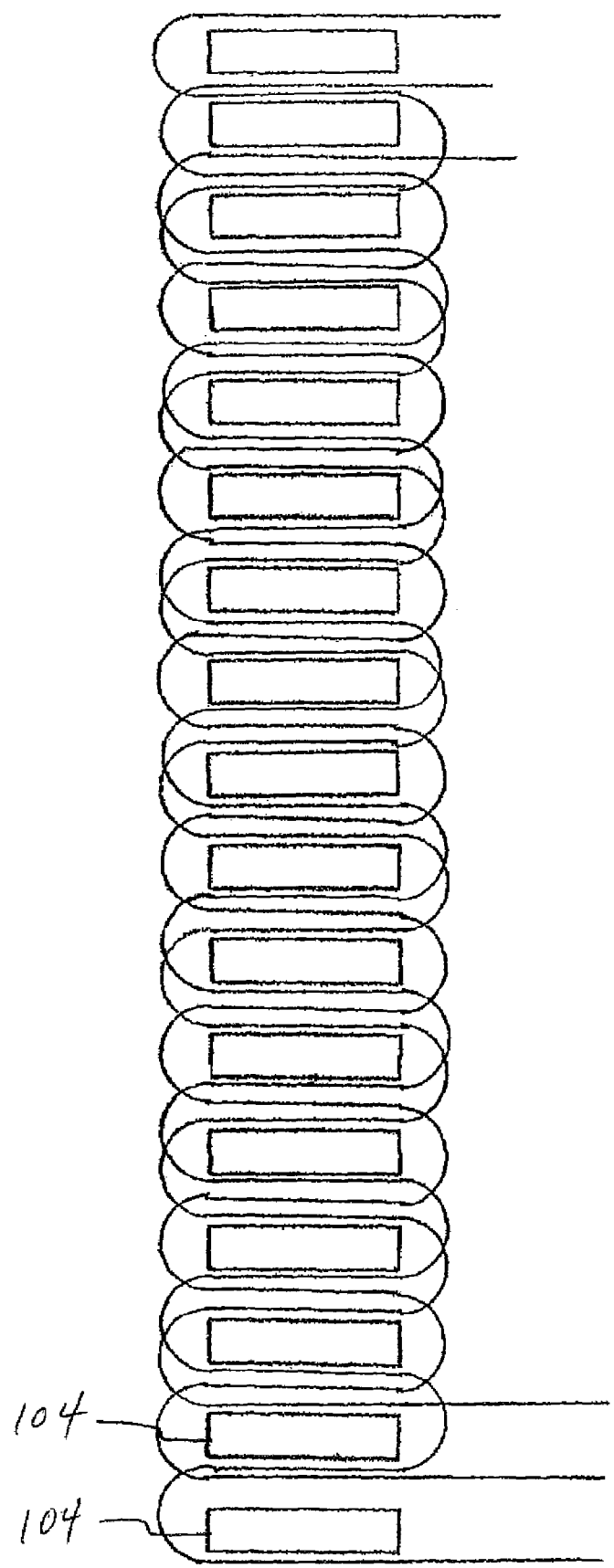
FIG. 4B shows stator blocks wound with a three-phase winding.

In one embodiment, a stator block 104 is formed by stacking a plurality of strips of non-magnetic, permeable material. In one embodiment, strips of I-shaped magnetically, permeable material are stacked to form a stator block. For example, strips of M6-29 Gage material having consistent grain direction can be used to form a stator block. FIG. 3 shows a strip of an I-shaped material that forms the building block of a stator block. FIG. 4A shows a stator block formed by a stack of the I-shaped strips, and FIG. 4B shows stator blocks wound by a three-phase winding.

In one embodiment, after the stator blocks 104 are wound by the three-phase winding, the stator blocks 104 are epoxy potted or otherwise secured together to form a rigid, annular structure. The rigid annular structure is then mounted on the ring-shaped support structure 112 shown in FIG. 2.

Figure 5:
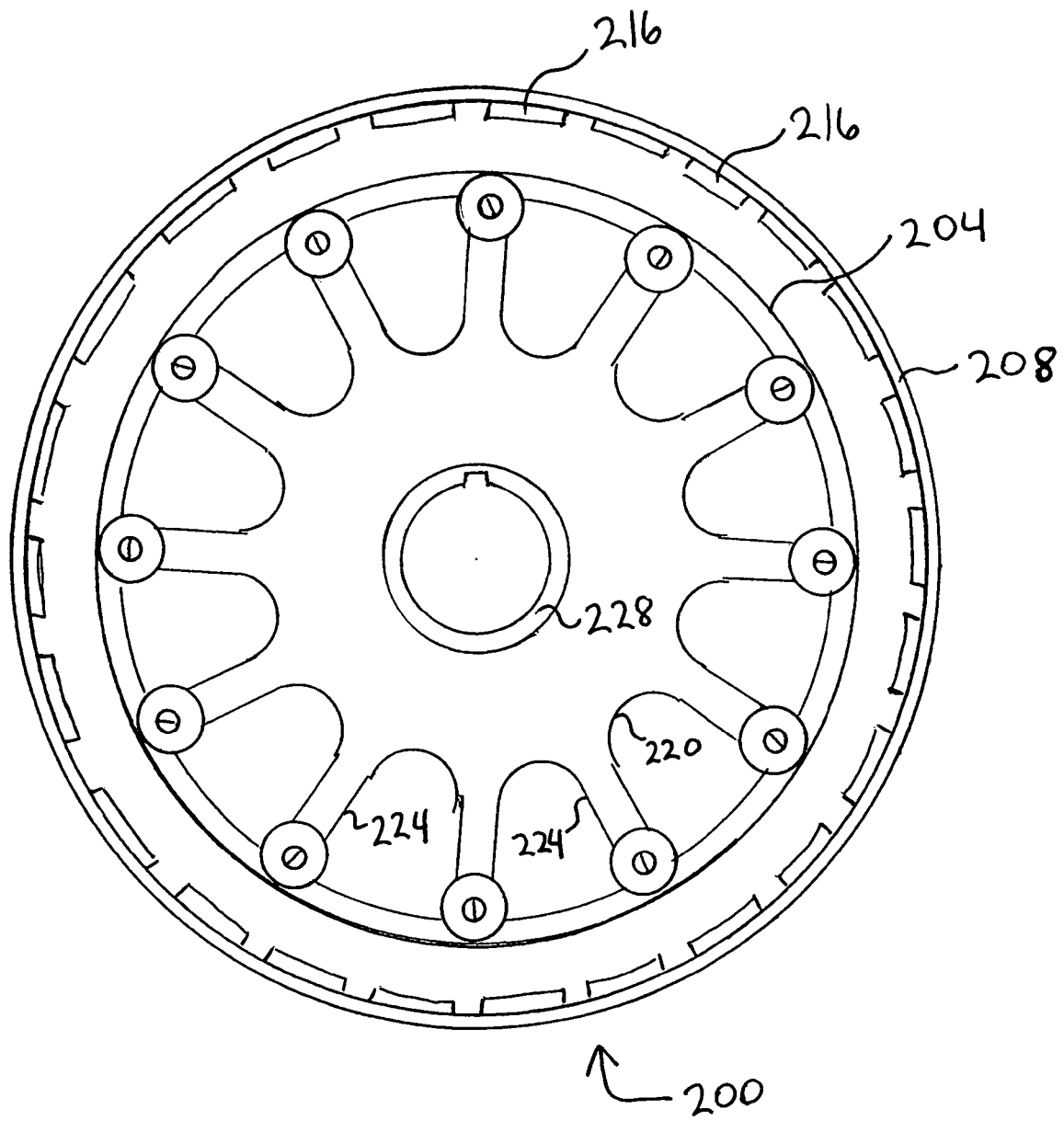
FIG. 5 is a plan diagram of a rotor assembly in accordance with one embodiment of the invention.

FIG. 5 is a plan diagram of a rotor assembly 200 in accordance with one embodiment of the invention. The rotor assembly is concentric with an axis of rotation. The rotor assembly 200 includes two concentric annular rings, an inner ring 204 and an outer ring 208.

Figure 6:
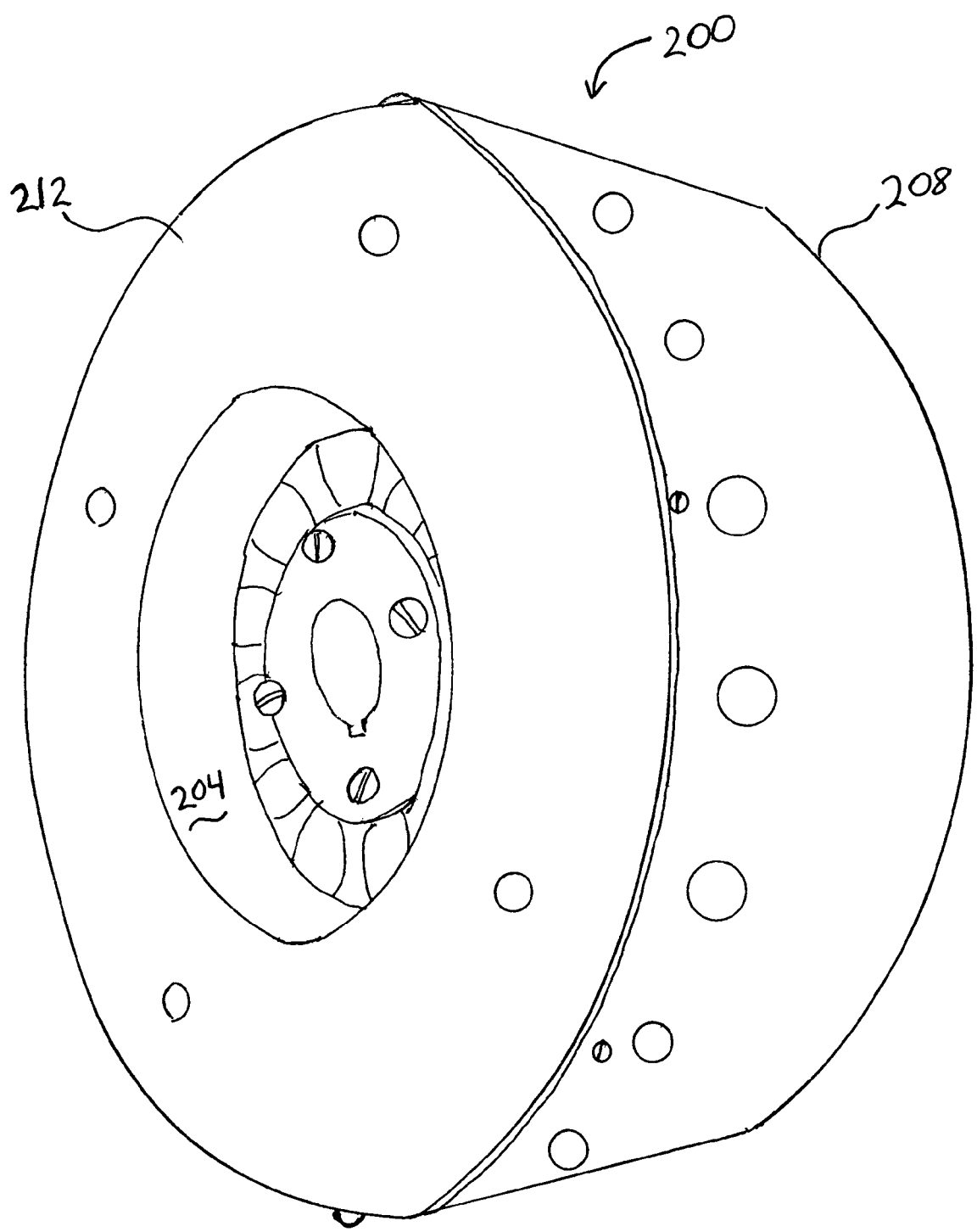
FIG. 6 is a perspective view of the rear side of a rotor assembly.

FIG. 6 is a perspective view of the rear side of the rotor assembly 200. The concentric inner and outer rings 204 and 208, respectively, are held in alignment by a disc-shaped rear frame 212 that has a circular opening at the center. The rear frame 212 maintains a radial gap between the inner and outer rings 204 and 208. In one embodiment, the rear frame 212 is made from an electrically insulating, composite material that electrically isolates the inner and outer rings, 204 and 208, from one another. The inner and outer rings, 204 and 208, are attached to the rear frame 212 by suitable means.

Referring back to FIG. 5, the rotor assembly 200 has a plurality of permanent magnets 216 substantially evenly distributed on the inner surface of the outer ring 208. Each permanent magnet has a north pole and a south pole. The permanent magnets are placed on the outer ring 208 so that each adjacent magnet pair has opposite north/south polarities. The poles are aligned with the rotational axis of the rotor assembly 200.

In one embodiment, the permanent magnets 216 are epoxy potted to the body of the outer ring 208, and may also be banded with wire to the body of the outer ring 208, to help retain the permanent magnets 216 in place at high rotational speeds. The permanent magnets 216 may be attached to the body of the outer ring 208 by other suitable means. As will be understood by those skilled in the art, the precise number of permanent magnets 216 will be determined by the number of rotor poles desired.

Figure 7:
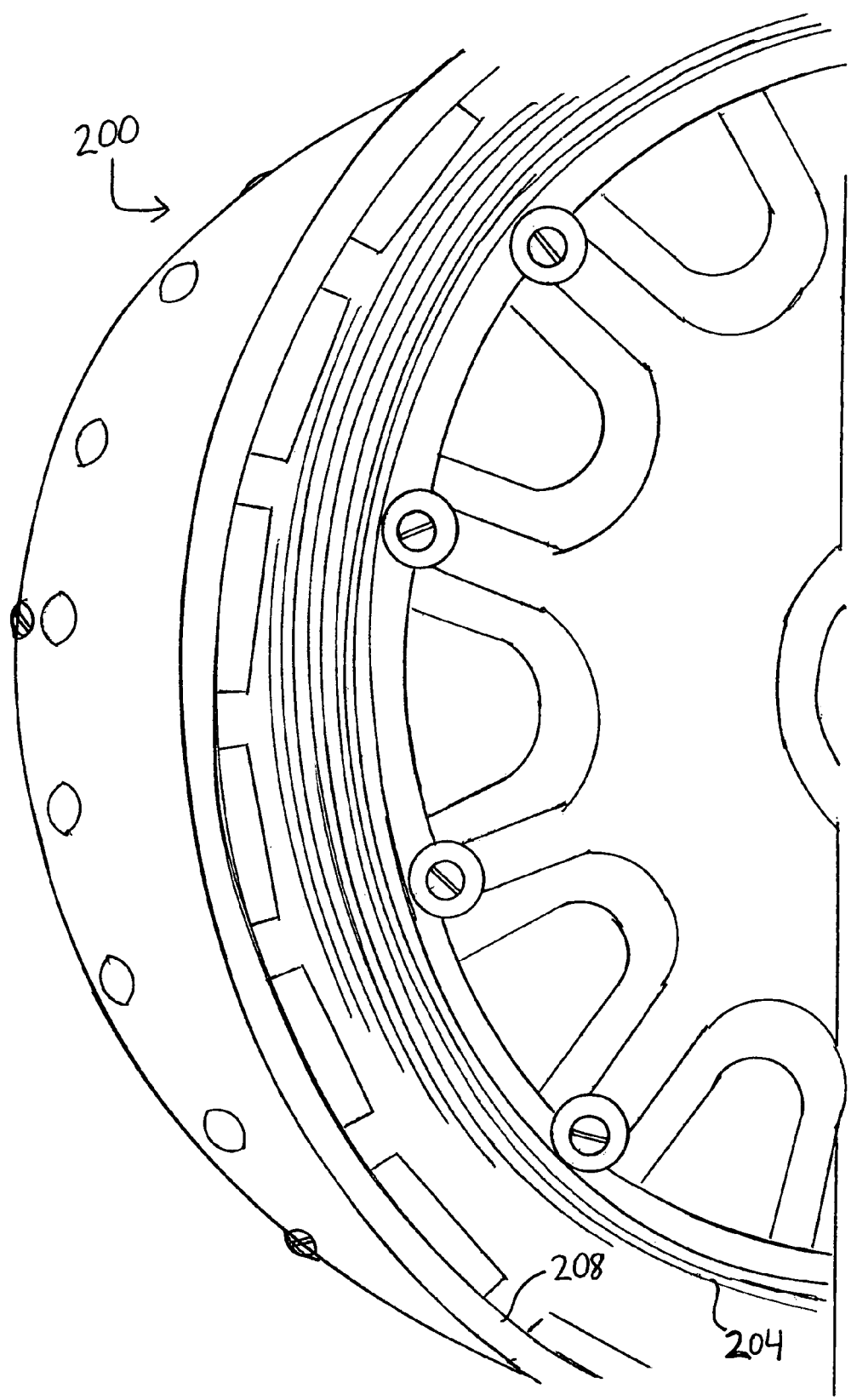
FIG. 7 is a perspective view of a section of the rotor assembly.

In one embodiment, the outer ring 208 is made from a magnetically, permeable material. For example, Carbon 0.15/20, Manganese 0.60/90 and other suitable material can be used to make the outer ring 208. In one embodiment, the inner ring 204 is made from a plurality of ring-shaped strips. The ring-shaped strips are stacked to form the inner ring 204, thereby resulting in a laminated structure. The ring-shaped strips are made from a magnetically, permeable material. The strips can be epoxy potted or otherwise glued together. The strips may also be stacked and attached with washers and screws. FIG. 7 is a perspective view of a section of the rotor assembly 200 illustrating the construction of the of the inner ring 204 and the outer ring 208. As shown in FIG. 7, the outer ring 208 is made from a solid material while the inner ring 204 is constructed by a plurality of ring-shaped strips.

Referring back to FIG. 5, the rotor assembly 200 includes a rotor fan 220 having a plurality of rotor blades 224 and a circular opening at the center. The rotor blades 224 are attached to the inner ring 204 by suitable means. In one embodiment, the rotor assembly 200 includes a cylindrical central hub 228 concentric with the axis of rotation. The rotor fan 220 is mounted on the cylindrical hub 228. The cylindrical hub 228 is configured to be rotationally coupled to a shaft (not shown in FIG. 4) that is coupled to a source of rotational energy. As will be appreciated, the cylindrical hub 228, the rotor fan 224 and the rear frame cooperatively provide structural support to the rotor assembly 200. Also, when the rotor assembly 200 is in rotation, the rotor fan 220 creates air-flow that cools the rotor assembly 200. In one embodiment, the rotor fan 220 is made from a composite, insulator-type material.

Figure 8:
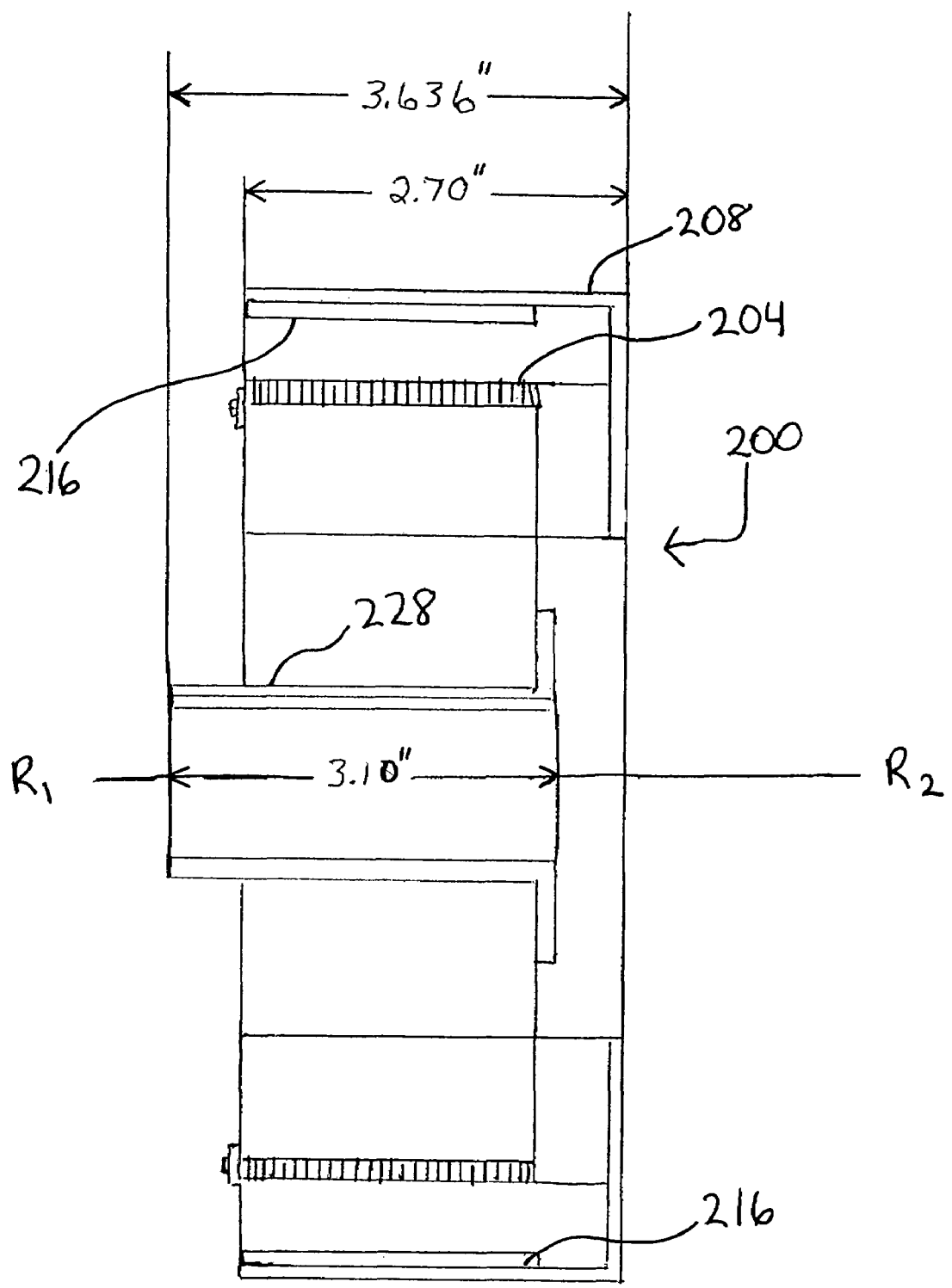
FIG. 8 is a cross-sectional view of the rotor assembly.

FIG. 8 is a cross-sectional view of the rotor assembly 200. The rotor assembly 200 comprises concentric inner and outer rings 204 and 208, respectively. The outer ring 208 is made from a non-magnetically permeable material. The inner ring 208 is made by bonding or stacking a plurality of rings as indicated by its laminated structure. A plurality of permanent magnets 216 are attached to the inner surface of the outer ring 208. The poles of the magnets are aligned to the rotational axis of the rotor assembly indicated by the lines R1-R2. The outer and inner rings are aligned in place cooperatively by the cylindrical hub 228, the rotor fan 220 and the rear frame. The cylindrical hub is sized to be coupled a shaft (not shown in FIG. 8), which turns the rotor assembly.

A radial gap exists between the outer surfaces of the inner ring 204 and the permanent magnets 216. This radial gap is determined by the radii of the inner and outer rings and the thickness of the permanent magnets. As will be explained later, the stator member 108 is interposed between the inner and outer rings. In other words, the stator member 108 is placed inside the radial gap.

Figure 9:
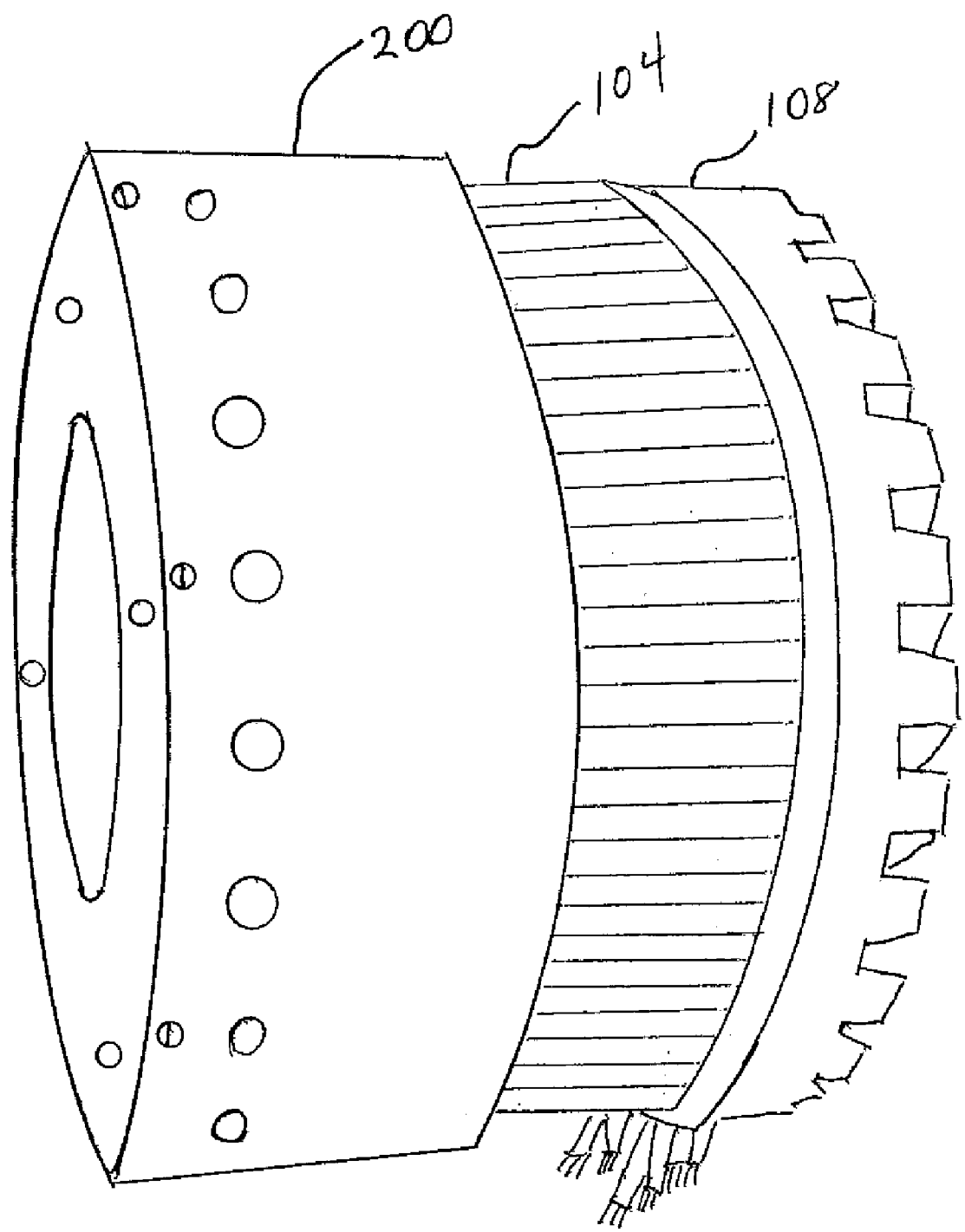
FIG. 9 shows the stator member partially inserted inside the rotor assembly.

FIG. 9 shows the stator member 108 partially inserted inside the rotor assembly 200. As discussed before, the stator member 108 is interposed between the inner and outer rings. When the electric generator is fully assembled, the stator member 108 circumferentially encircled by the rotor assembly 200, with the stator member 108 residing within the radial gap between the inner and outer rings of the rotor assembly. Thus, the rotor assembly 200 rotates encircling the stator member 108. As shown in FIG. 9, leads of the three phase winding for a three-phase output are accessible.

As will be appreciated by those skilled in the art, upon assembly the stator member 108 is encircled by the outer ring 208 of the rotor assembly 200, while the inner ring 204 of the rotor assembly is encircled by the stator member 108. During operation, each stator block 104 can supply a specific amount of current at a specific voltage, depending on the construction of the stator block 104 and the rotational force of the magnets 216 attached to a rotor assembly passing in close proximity to the stator blocks 104. Based on the principle that moving magnets create electrical currents in closed circles of wire, electrical energy is generated when the rotor assembly, rotationally coupled to a source of rotational energy, is rotated at high speed encircling the stator member 108.

As will be appreciated, only the stator assembly 100, which is the stationary member, have windings. The rotor assembly 200, which is the rotational member does not include any winding. As such the generator does not require any brush contacts, which makes the generator reliable and relatively maintenance free.

Figure 10:
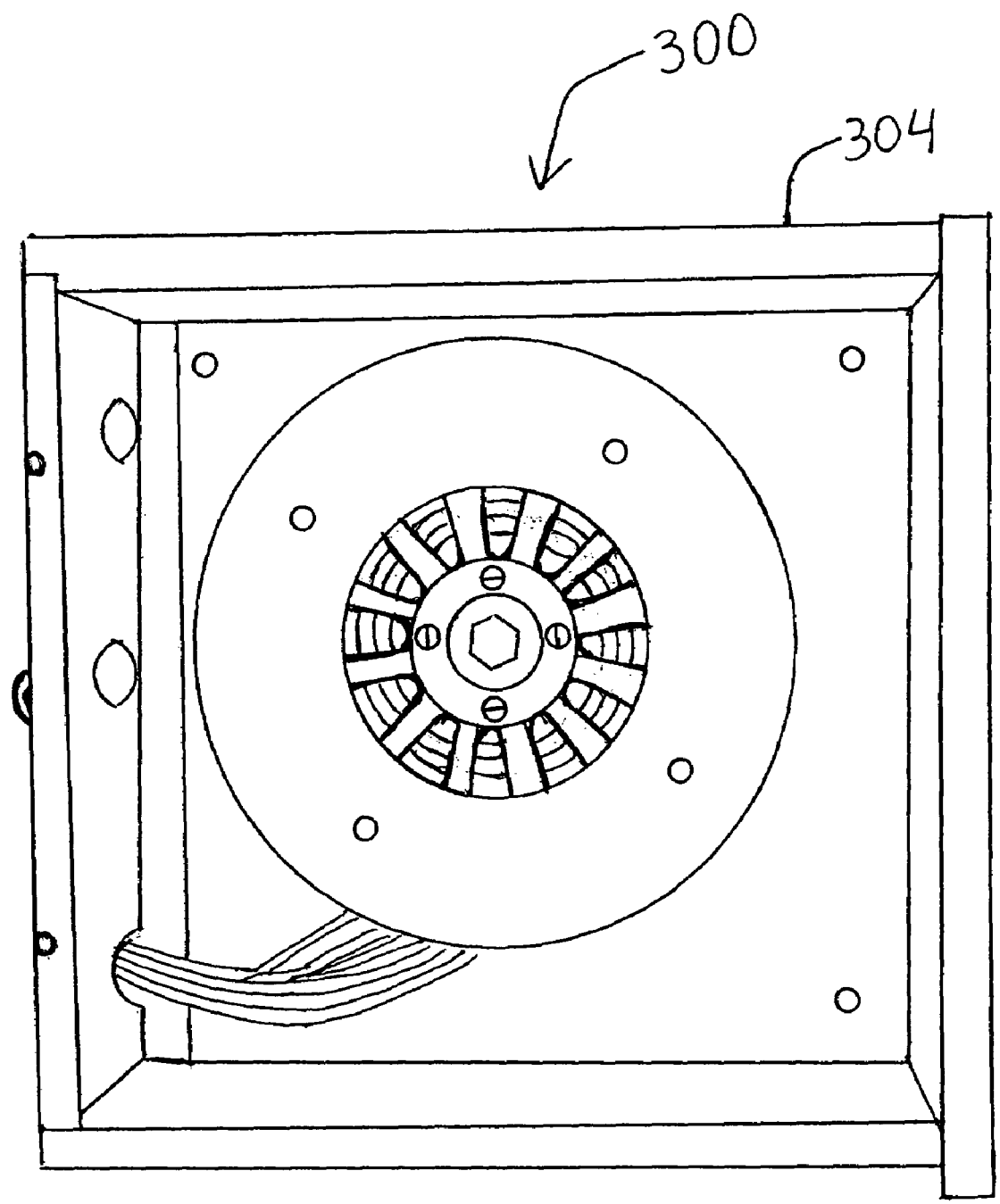
FIG. 10 illustrates a permanent magnet electric generator in accordance with one embodiment.

FIG. 10 illustrates a permanent magnet electric generator 300 in accordance with one embodiment. The generator includes a housing 304 which houses the stator assembly and the rotor assembly discussed above. The shaft is rotationally coupled to a source of rotational energy to rotate the rotor assembly (not shown in FIG. 10).

In one embodiment, the 24 permanent magnets were attached to the inner surface of the outer ring 208. In one embodiment, the permanent magnets were made from H27 type material. In one embodiment, 73 stator blocks were used to construct the stator member. In one embodiment, Silicon grade M29 laminations were used to construct the stator blocks.

It will be apparent to those of skill in the art that the number of stator elements 104 and the magnets may be varied to suit the desired characteristics of the generator. Also, the relative size and precise configuration of various components and elements of the generator may be varied.

It will be apparent to those skilled in the art that the rotor assembly can have more than two rings. Also, the rotor assembly can have only a single ring that circumferentially encircles or surrounds the stator member.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A permanent magnet, brushless electric generator comprising:
   a housing;
   a rotor assembly disposed inside the housing and being concentric with an axis of rotation, the rotor assembly having an axially disposed annular outer ring and a laminated inner ring, the laminated inner ring being formed by a plurality of thin, ring-shaped magnetically permeable material, the rotor assembly having a cylindrical rotor hub concentric with the axis of rotation, the rotor hub adapted to be rotationally coupled to a shaft for rotating the rotor assembly, the rotor assembly having a plurality of magnets distributed on the inner surface of the outer ring, each magnet having a north pole and a south pole aligned to the axis of rotation such that adjacent magnet have poles of alternating polarity;
   a stator assembly secured inside the housing at a static location with respect to and in close proximity to the rotor assembly, the stator assembly having a plurality of stator blocks placed in the form of an annular ring-shaped stator member retained by a support structure, the stator blocks being formed by a plurality of I-shaped strips of magnetically permeable material, the stator member being concentric with the axis of rotation and being interposed between the inner and outer rings such that the outer ring circumferentially encircles the stator member, the stator member wound in a three-phase winding,
   wherein electricity is generated in the three-phase winding by rotation of the rotor assembly in relation to the stator assembly.

2. The permanent magnet electric generator of claim 1, wherein the three-phase winding extends laterally through the gaps of the adjacent stator blocks.

3. The permanent magnet electric generator of claim 1, wherein the outer ring is made from a magnetically permeable material.

4. The permanent magnet electric generator of claim 1, wherein the stator member is epoxy potted and is securely attached to the support structure.

5. The permanent magnet electric generator of claim 1, further comprising a heat sink attached to the support structure, the heat sink configured to dissipate heat generated during operation of the generator.

6. The permanent magnet electric generator of claim 1, further comprising a rotor fan mounted on the cylindrical hub, the rotor fan having a plurality of blades attached to the inner ring.

7. The permanent magnet electric generator of claim 6, wherein the rotor fan is made from an insulating material.

8. The permanent magnet electric generator of claim 1, further comprising a circular rear frame with an opening about the center, the circular rear frame configured to retain the inner and outer rings in place.

9. The permanent magnet electric generator of claim 8, wherein the circular rear frame is made from an insulating material.

10. The permanent magnet electric generator of claim 1, wherein the permanent magnets are distributed circumferentially on the inner surface of the outer ring and in close proximity to the stator blocks.

11. The permanent magnet electric generator of claim 1, wherein the stator member is interposed between the inner and outer rings to form a first air gap between the permanent magnets and the stator member.

12. The permanent magnet electric generator of claim 1, wherein the stator member is interposed between the inner and outer rings to form a second air gap between the stator member and the inner ring.

13. The permanent magnet electric generator of claim 1, wherein the shaft is rotationally coupled to a source of rotational energy to rotate the rotor assembly.

14. A permanent magnet, brushless electric generator comprising:
   a housing;
   a rotor assembly disposed inside the housing and being concentric with an axis of rotation,
   the rotor assembly having an annular outer ring and a laminated inner ring concentric with the axis of rotation, the laminated inner rings being formed by a plurality of thin, ring-shaped magnetically permeable material, the rotor assembly adapted to be rotationally coupled to a source of rotational energy for rotating the rotor assembly, the rotor assembly having a plurality of magnets distributed on the inner surface of the outer ring, each magnet having a north pole and a south pole aligned to the axis of rotation such that adjacent magnets have poles of alternating polarity;
   a stator assembly secured inside the housing at a static location with respect to and in close proximity to the rotor assembly, the stator assembly having a plurality of stator blocks placed in the form of an annular ring-shaped stator member retained by a support structure, the stator blocks being formed by a plurality of I-shaped strips of magnetically permeable material, the stator member being interposed between the inner and outer rings such that the outer ring circumferentially encircles the stator member, the stator member wound in a three-phase winding, wherein electricity is generated in the three-phase winding by rotation of the rotor assembly in relation to the stator assembly.

15. The permanent magnet electric generator of claim 14, wherein the three-phase winding extends laterally through the gaps of the adjacent stator blocks.

16. A permanent magnet, brushless electric generator comprising:

a housing;

a rotor assembly disposed inside the housing and being concentric with an axis of rotation, the rotor assembly having an annular outer ring and a laminated inner ring, the rotor assembly adapted to be rotationally coupled to a source of rotational energy for rotating the rotor assembly, the rotor assembly having a plurality of magnets distributed on the inner surface of the outer ring, each magnet having a north pole and a south pole aligned to the axis of rotation such that adjacent magnets have poles of alternating polarity;

a stator assembly secured inside the housing at a static location with respect to and in close proximity to the rotor assembly, the stator assembly having a plurality of laminated stator blocks placed in the form of an annular ring-shaped stator member retained by a support structure, the stator blocks being formed by a plurality of I-shaped strips of magnetically permeable material, the stator member being concentric with the axis of rotation and being interposed between the inner and outer rings such that the outer ring circumferentially encircles the stator member, the stator member wound in a three-phase winding, wherein electricity is generated in the three-phase winding by rotation of the rotor assembly in relation to the stator assembly.

17. The permanent magnet electric generator of claim 16, wherein the three-phase winding extends laterally through the gaps of the adjacent stator blocks.

* * * * *